June 5, 1962  J. DE SILVA  3,037,480
NEST HAMMOCK FOR MINK
Filed March 31, 1960
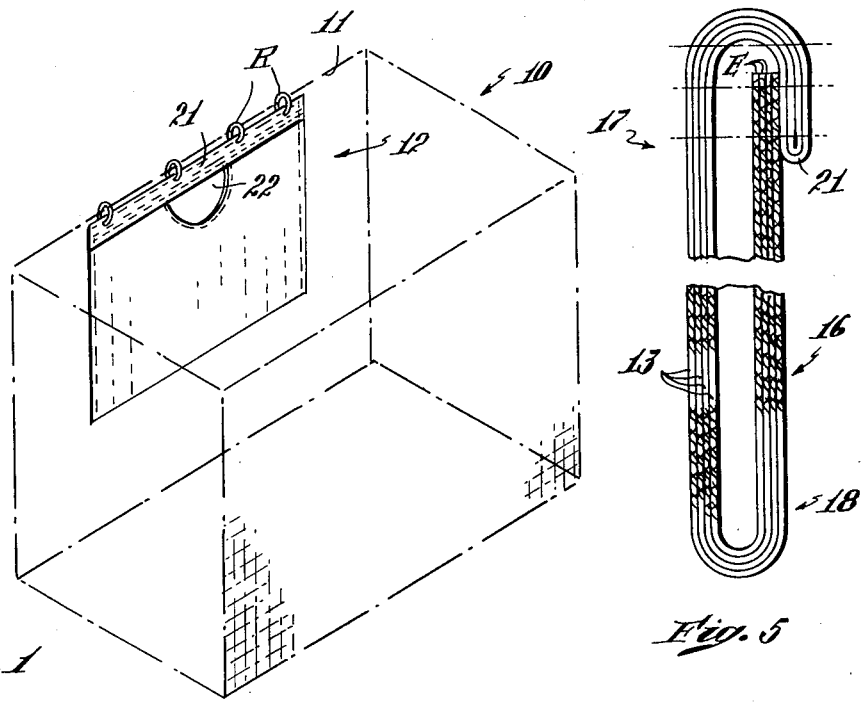
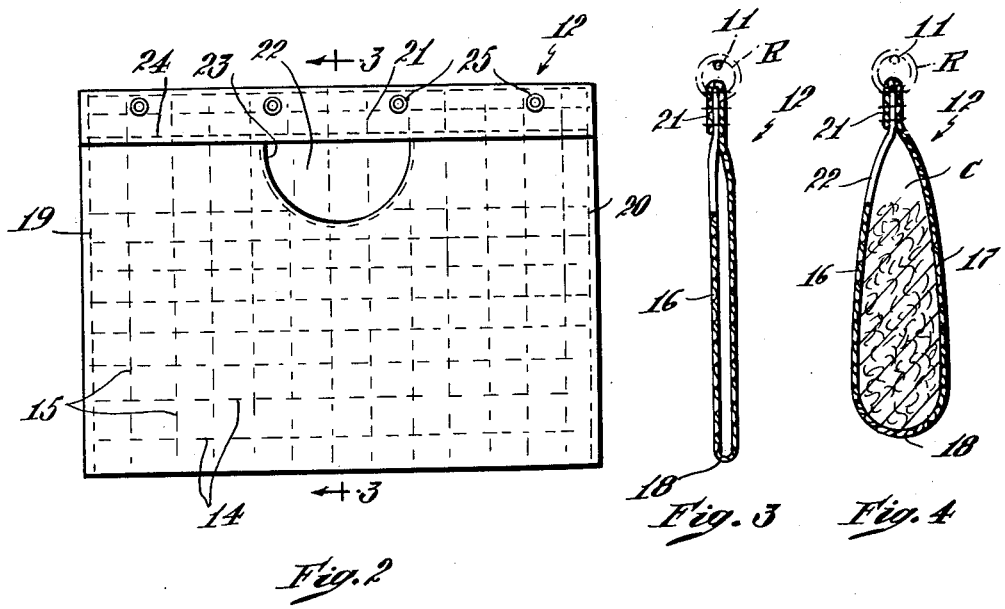
Inventor
John de Silva
by Roberts Cushman & Grover
Attys

United States Patent Office 3,037,480
Patented June 5, 1962

3,037,480
NEST HAMMOCK FOR MINK
John de Silva, Pembroke, Mass.
Filed Mar. 31, 1960, Ser. No. 19,108
4 Claims. (Cl. 119—45)

This invention pertains to animal husbandry, more especially to the raising of mink on a commercial scale and, in particular, to a sleeping hammock or nest for a mink or other animal of similar habits.

Because of its cannibalistic nature, it is necessary in the raising of mink for fur to keep each animal in an individual cage, but for economic reasons these cages are restricted in size, so that the animal is confined to rather close quarters.

Since animals of the genus Mustela, to which mink and weasels belong, have no natural instinct for personal cleanliness, as do certain other animals, for example, those of the cat family, it is a serious problem, in keeping mink under close confinement, to prevent the animal's fur from becoming matted with excrement, the remains of food, etc., so that permanent staining or other damage to the fur frequently results. The difficulty is increased from the fact that, in order that a mink may thrive in captivity, it must have a darkened nest in which it may curl up and keep warm and where it spends most of its time. However, since according to customary practice, the nest provided takes the form of a box placed upon the floor of the cage, the dirt on the cage floor is dragged into the nest with the mink, thus quickly fouling the nest material, for example, hay, so that the animal is surrounded and in close contact with dirty material much of the time.

The present invention has for its object the provision of means whereby the probability of damage to the mink's fur from such causes is substantially lessened. A further object is to provide a nest that is of a character such as to minimize the amount of dirt which will be carried into it as the mink enters. A further object is to provide an elevated nest, in the form of a hammock or cradle, designed to be suspended above the floor of the cage and having an entrance aperture of a size, and so located, that the mink, in order to enter, must stand upright so that dirt loosely clinging to its fur tends to drop off. A further object is to provide a hammock with means for suspending it from the top of the cage and of a material providing an acceptably dark interior, although being at least somewhat pervious to air, and amply strong to support the weight of the mink and to withstand its frequent moving about while in the nest, and furthermore, a material which offers little incentive to the mink to bite and tear it.

In attaining these objectives, the invention takes advantage of the instinct of the mink to investigate any hole, especially one giving entrance to a dark space, by providing a hammock which may be suspended from the top of the cage and which provides a dark interior space, which may be filled with hay or other nesting material, and which has an entrance hole of a size which is sufficiently large to permit the mink to crawl through it easily. This hammock may, for example, be made of burlap or similar cheap but strong textile fabric. Desirably several plies are sewed together to form a multi-layer bag-like structure of a suitable shape to provide the desired nesting or hiding place. A plurality of united plies of relatively thin material provides strength coupled with flexibility, and is to be preferred to a single heavy ply.

Practical tests of such a device on a commercial scale have shown that its use results in a great reduction in damage to the fur from matting and staining, as compared with the results of customary practice, wherein a nest box is placed on the cage floor.

The invention will be more fully disclosed in the following more detailed description and by reference to the accompanying drawings wherein FIG. 1 is a diagrammatic view, showing in broken lines, a cage of more or less conventional type such as used in the raising of mink, but with the improved hammock or nest of the present invention shown in full likeness as suspended from one of the top bars of the cage;

FIG. 2 is a front elevation, to larger scale than FIG. 1, showing the hammock of the present invention as it appears before it is hung in the cage;

FIG. 3 is a section on the line 3—3 of FIG. 2 showing the collapsed hammock, more or less diagrammatically, without any attempt to illustrate the number of plies which may be used in its construction, nor their exact mode of assembly;

FIG. 4 is similar to FIG. 3 but showing the hammock as distended by the inclusion of a mass of nesting material, such as hay, and as it would appear when in use; and FIG. 5 is a fragmentary section in the same plane as that of FIG. 3 but to a much larger scale illustrative of a desirable arrangement of the plies of textile fabric in the making of the hammock.

Referring to the drawings, the numeral 10 designates a rectangular cage which may be of any desirable or conventional construction useful in the raising of mink, the outlines of the cage being shown in broken lines and no attempt being made to illustrate its exact construction, although it is shown, by way of example, as having a rigid top bar 11, which forms the support for the cradle of the present invention. This cradle, indicated by the numeral 12, is shown as having a strong and heavy hem or like structure 21 along its upper edge in which are receiving rings R by means of which the hammock is suspended from the bar 11 of the cage.

While other materials may be employed for making the hammock, ordinary burlap has been found very suitable since it is strong, pervious to air, and relatively cheap as compared with most textile fabrics of the desired strength and porosity. Preferably, a length of the fabric is doubled and then folded as generally indicated in FIG. 5, so that its raw edges E are concealed behind the part 21 hereinbefore referred to as a "hem." The folded material extends downwardly to form the front wall 16 of the hammock and is then turned at 18 and extends upwardly to form the rear wall 17 of the hammock. At the upper portion of the hammock, the front and rear walls are brought into contact and the ends of the hammock are permanently united (FIG. 2) by sewed seams at 19 and 20. The hem portion 21, whose lower edge is formed by the initial fold of the material, is permanently united to the front and rear walls by a sewed seam at 24.

Preferably, after the initial doubling of the fabric, its several plies are united at regularly spaced intervals, by parallel sewed seams, for example, as indicated at 14, and also by similar seams 15 extending at right angles to the seams 14. Preferably, also, before the material is folded, as shown in FIG. 5, an entrance hole 22 is formed by cutting the material downwardly from the raw edges E, preferably on an arc, to provide a hole of approximately semi-circular contour, the margin of this opening being hemmed, bound with tape, or otherwise reinforced as indicated at 23.

Desirably, openings 25, preferably provided with metal grommets to prevent tearing, are provided in the hem 21 for the reception of suspension elements such as the rings R by means of which the hammock is suspended in the upper part of the cage.

Merely by way of example, it has been found that the horizontal length of the hammock, that is the distance from its righthand to its lefthand end will be of the order of sixteen inches and its maximum height from, upper edge to lower edge, approximately eleven inches. The entrance hole may be of the order of four and one-quarter inches along the lower edge of the hem 21 and of a maximum depth below the hem of two and three-quarters inches.

When of the above dimensions, the hammock provides an interior chamber C, FIG. 4, of ample size for the reception of a suitable quantity of nesting material, such as hay, in which the mink may curl up. When suspended from the upper part of the cage, the entrance opening 22 is of a height such that the mink may readily enter the opening by erecting himself on his hind legs. It has been found that, when such a hammock is placed in the cage, it takes but a very short time for the mink to learn to climb up into the hammock through the hole 22.

In so climbing up, loose dirt attached to the mink's fur tends to drop off and there is no tendency to drag dirt from the floor into the interior of the hammock. The nest is thus kept far cleaner than when in a box placed on the floor and the damage to fur is greatly diminished.

While one desirable embodiment of the invention has herein been disclosed, by way of example, it is to be understood that the invention is broadly inclusive of any and all modifications, either of materials employed, the manner of assembly, or the shape or dimensions of the hammock, such as fall within the scope of the appended claims.

I claim:

1. In combination with a cage for use in the commercial raising of mink, a nest hammock so elevated above the floor of the cage that the mink must erect itself upon its hind legs to enter the interior of the device, said hammock comprising front and rear walls of flexible, substantially opaque material, united along their margins to form a bag-like receptacle having an interior chamber for the reception of loose nesting material, one of said walls having an entrance opening in its upper part of a size such as to enable a mink to pass through it in entering or leaving the interior chamber, and means suspending the hammock within the cage so that its bottom is spaced from the floor of the cage.

2. A nesting hammock for use in a mink cage, said hammock comprising front and rear walls which, when the hammock is suspended for use, are substantially vertical, said walls being permanently united at top, bottom and both ends to form a bag-like receptacle having an interior chamber for the reception of loose nesting material, one of the walls having an access opening in its upper part, of a size to permit a mink to pass through into the interior, and means for suspending the hammock from an elevated support, the walls of the hammock being of multi-ply substantially opaque textile fabric such that but little light enters except through the access opening.

3. A nesting hammock according to claim 2 wherein each wall of the chamber consists of a plurality of layers of burlap united by spaced parallel seams, the walls being united at their margins by sewed seams and having grommets fixed in the upper margin of the hammock for the reception of suspension elements.

4. A punch-like nesting hammock for use in a mink cage, said hammock being of textile fabric and comprising front and rear walls, which, when the hammock is suspended for use, are approximately vertical, said walls being permanently united along their top, bottom and end margins so as to define an interior chamber in which loose nesting material may be placed, the hammock having a thickened portion extending along its upper margin thereby to reinforce it for the reception of suspension elements, one of said walls having an access opening of a size to permit a mink to pass, said opening being near the upper edge of one of said walls and just below said reinforcing portion, means reinforcing the boundary of the opening, the textile fabric of which the hammock is made being such as to be pervious to air but being substantially opaque to light, so that the interior chamber is dark except for such light as enters through the access opening, and suspension elements at the upper part of the hammock whereby it may be suspended with its lower margin well above the floor of the cage.

References Cited in the file of this patent

UNITED STATES PATENTS

| | | |
|---|---|---|
| 1,256,956 | Turner | Feb. 19, 1918 |
| 2,032,248 | Bins | Feb. 25, 1936 |
| 2,329,347 | Graham | Sept. 14, 1943 |
| 2,713,323 | Marsh | July 19, 1955 |
| 2,822,780 | Buell | Feb. 11, 1958 |